(12) United States Patent
Ur

(10) Patent No.: US 9,196,094 B2
(45) Date of Patent: Nov. 24, 2015

(54) METHOD AND APPARATUS FOR AUGMENTED REALITY

(71) Applicant: Empire Technology Development LLC, Wilmington, DE (US)

(72) Inventor: Shmuel Ur, Galil (IL)

(73) Assignee: Empire Technology Develoment LLC, Wilmington, DE (US)

( * ) Notice: Subject to any disclaimer, the term of this patent is extended or adjusted under 35 U.S.C. 154(b) by 26 days.

(21) Appl. No.: 13/989,858

(22) PCT Filed: Nov. 30, 2012

(86) PCT No.: PCT/US2012/067405
§ 371 (c)(1),
(2) Date: May 28, 2013

(87) PCT Pub. No.: WO2014/084858
PCT Pub. Date: Jun. 5, 2014

(65) Prior Publication Data
US 2014/0184645 A1    Jul. 3, 2014

(51) Int. Cl.
*G06T 19/00*    (2011.01)
*G06F 13/00*    (2006.01)
*G06Q 50/06*    (2012.01)

(52) U.S. Cl.
CPC .............. *G06T 19/006* (2013.01); *G06F 13/00* (2013.01); *G06Q 50/06* (2013.01); *Y02B 60/1228* (2013.01)

(58) Field of Classification Search
CPC .................................................. G06T 19/006
See application file for complete search history.

(56) References Cited

U.S. PATENT DOCUMENTS

| 5,155,474 A | 10/1992 | Park et al. |
| 5,737,533 A | 4/1998 | DeHond |
| 2004/0189675 A1 | 9/2004 | Pretlove et al. |
| 2008/0158256 A1* | 7/2008 | Russell et al. ................ 345/629 |
| 2011/0150450 A1 | 6/2011 | Schnell |
| 2012/0242798 A1 | 9/2012 | McCardle et al. |

OTHER PUBLICATIONS

Int'l Search Report and Written Opinion, OCT/US12/067405, mailed 19 Feb. 2013, 11 pages.
"Smart Dust" -From SciFi to Reality: "The Coming Era of Sensor Computing," accessed at https://web.archive.org/web/20121116033329/http://www.dailygalaxy.com/my_weblog/2010/02/smart-dust--the-emergence-of-sensor-computing-the-science-fiction-dream-of-smart-dust-is-still-a-ways-off-but-moving-closer-t.html, posted on Feb. 4, 2010, pp. 1-3.
"Imec Virtual Camera (iVC), the ultimate angle on reality," accessed at https://web.archive.org/web/20100528134313/http://www2.imec.be/be_en/press/imec-news/ivc.html, posted on Apr. 12, 2010, pp. 1-2.
"Light pollution," accessed at https://web.archive.org/web/20121108093843/http://en.wikipedia.org/wiki/Light_pollution, modifies on Oct. 25, 2012, pp. 1-14.
"Lighting," accessed at https://web.archive.org/web/20121129215401/https://en.wikipedia.org/wiki/Lighting, modified on modified on Nov. 23, 2012 , pp. 1-16.

(Continued)

*Primary Examiner* — Jeffery A Brier
(74) *Attorney, Agent, or Firm* — The Juhasz Law Firm

(57) ABSTRACT

A method for providing an augmented reality includes capturing a real image from information contained in a visible light; generating a virtual image from the captured image; displaying on an augmented reality device a view selected from the group consisting of the real image and the virtual image; displaying the view of the real image in response to detection of a motion; and displaying the view of the virtual image in the absence of detected motion. An augmented reality device and a computer program product are disclosed.

28 Claims, 6 Drawing Sheets

(56) References Cited

OTHER PUBLICATIONS

"Motion detector," accessed at https://web.archive.org/web/20120829035936/http://en.wikipedia.org/wiki/Motion_detector, modified on Aug. 25, 2012, pp. 1-4.

Pasternack, A., "Virtual Reality Veneer: The Augmented Reality House (Photos)," accessed at https://web.archive.org/web/20121126070530/http://motherboard.vice.com/2010/6/15/virtual-reality-veneer-the-augmented-reality-house-photos--2, posted on Jun. 15, 2010, pp. 1-9.

Wilson, M., "World's Smallest Single Chip Camera Is Really Small," accessed at https://web.archive.org/web/20120117212357/http://gizmodo.com/283823/worlds-smallest-single-chip-camera-is-really-small, posted on Jul. 30, 2007, pp. 1-2.

* cited by examiner

500 A computer program product

502 A signal bearing medium

504 Machine-readable instructions that, when executed, cause a device to provide an application programming interface testing service by:

transmitting a virtual presentation of at least a first portion of a space to an augmented reality visual output device capable of being worn by a user, wherein the first portion of the space is substantially unlit;

receiving, from a motion detector, an indication of a motion in a second portion of the space subsequent to an image of the second portion being captured;

transmitting a command to a lighting element configured to illuminate at least a portion the second portion;

displaying a virtual presentation of at least a first portion of a space, wherein the first portion of the space is substantially unlit;

transmitting, to a camera configured to view at least a portion of the second portion, a command to capture an image;

receiving, from the camera, a captured image; and updating a database with the captured image for a future virtual presentation; or after a predetermined duration from transmitting the command to the lighting element, determining whether a second motion has been detected in the second portion of the space; and if no motion has been detected in the second portion of the space during the predetermined duration: transmitting, to the lighting element configured to light the portion the second portion, a lighting off command; and transmitting, to the augmented reality visual output device being worn by the user in the space, a virtual presentation of the second portion of the space.

| 506 a computer-readable medium | 508 a recordable medium | 510 a communications medium |

Fig. 5

METHOD AND APPARATUS FOR AUGMENTED REALITY

CROSS-REFERENCE TO RELATED APPLICATION

The present application is a U.S. National Stage filing under 35 U.S.C. §371 of PCT Application No. PCT/US2012/067405, filed on Nov. 30, 2012.

BACKGROUND

Unless otherwise indicated herein, the approaches described in this section are not prior art to the claims in this application and are not admitted to be prior art by inclusion in this section.

Artificial lighting consumes a significant portion of all electrical energy consumed worldwide. In homes and offices, for example, 20 to 50 percent of consumed energy may be due to lighting. In general, it may be desirable to reduce the amount of energy used for artificial lighting.

SUMMARY

In various embodiments, the present disclosure describes example methods for providing an augmented reality. Example methods may include transmitting a virtual presentation of an unlit portion of a space to an augmented reality visual output device capable of being worn by a user, receiving, from a motion detector, an indication of a motion in another portion of the space subsequent to an image of the second portion being captured, and transmitting a command to a lighting element configured to illuminate the other portion of the space.

Other example methods may include displaying a virtual presentation of an unlit portion of a space at an augmented reality visual output device capable of being worn by a user, receiving, from a motion detector, an indication of a motion in another portion of the space subsequent to an image of the second portion being captured, and transmitting a command to a lighting element configured to illuminate the other portion of the space.

In various embodiments, the present disclosure also describes example systems. Example systems may include an augmented reality visual output device configured to provide a virtual presentation of a space to a user, cameras configured to record of images of the space, motion detectors configured to detect motion in the space, light sources each for providing illumination within the space, and a control device to determine the virtual presentation of the space based on images of the space and a location and an orientation of the augmented reality visual output device, and to switch on a light source in response to a motion being detected by a motion detector.

In various embodiments, the present disclosure also describes example machine readable media. Example machine readable media may include instructions that, when executed, cause a device to provide an augmented reality by transmitting a virtual presentation of an unlit portion of a space to an augmented reality visual output device capable of being worn by a user, receiving, from a motion detector, an indication of a motion in another portion of the space subsequent to an image of the second portion being captured, and transmitting a command to a lighting element configured to illuminate the other portion of the space.

Other example machine readable media may include instructions that, when executed, cause an augmented reality device to provide an augmented reality by displaying a virtual presentation of an unlit portion of a space at an augmented reality visual output device capable of being worn by a user, receiving, from a motion detector, an indication of a motion in another portion of the space subsequent to an image of the second portion being captured, and transmitting a command to a lighting element configured to illuminate the other portion of the space.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 5 is an illustration of an example computer program product; and

DETAILED DESCRIPTION

Figure 1:
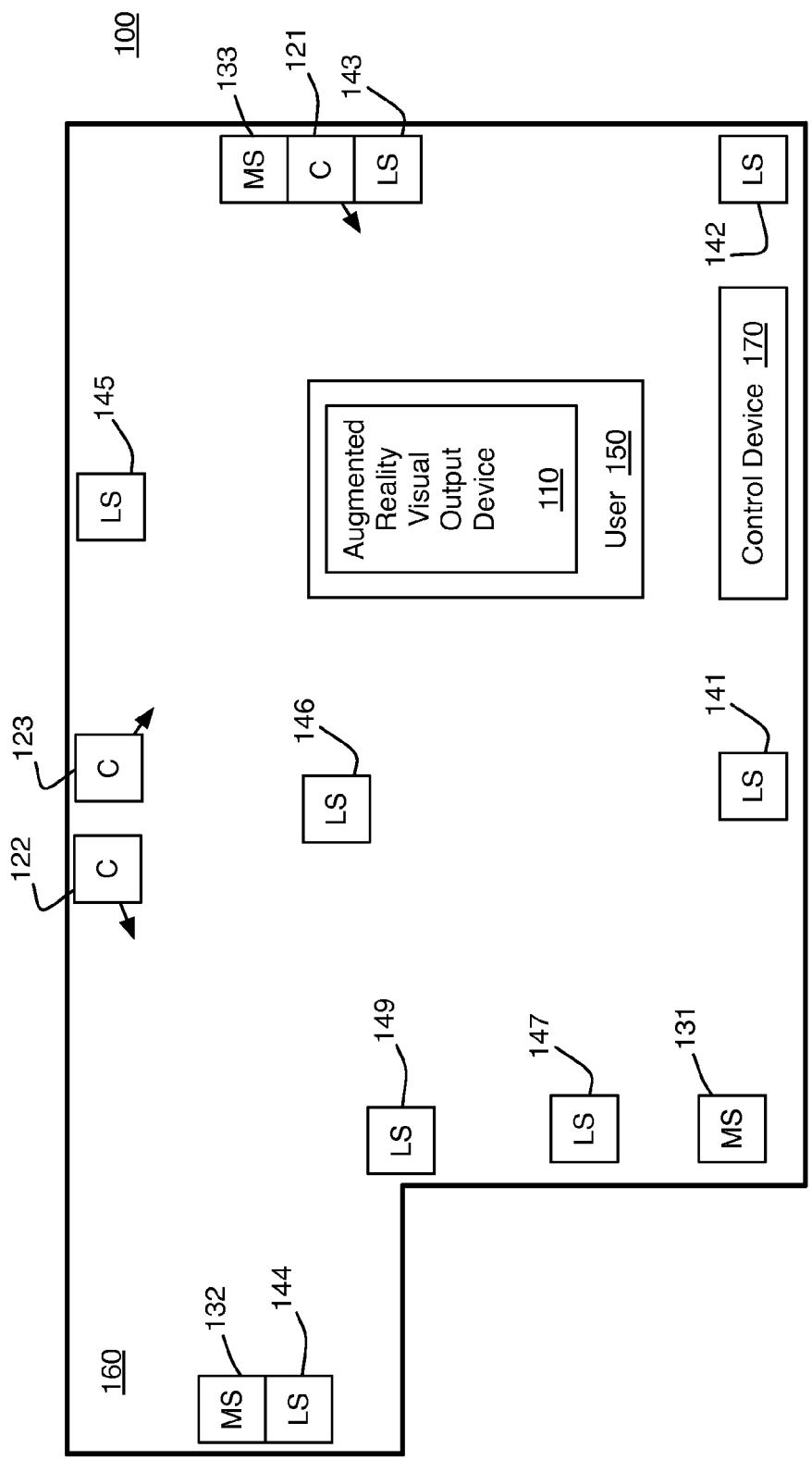
FIG. 1 is an illustration of a block diagram of an example system for providing an augmented reality.

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to energy savings using augmented reality.

Examples discussed herein may generally reduce the amount of energy used for artificial lighting. In some examples, a user may wear an augmented reality visual output device capable of displaying an augmented reality to the user. Either the augmented reality visual output device or another computing device may determine a virtual presentation of a space or a portion of a space for a user. The virtual presentation may be displayed to the user while lighting in the presented space may remain substantially unlit. The displayed virtual presentation may consume substantially less power than may be consumed by even high-efficiency lighting. In some examples, a motion in either the space being presented to the user or an adjacent space may be detected. If the motion is in the space being presented to the user or if the motion may affect the view of the user or may imminently affect the view of the user, the virtual presentation may be discontinued and the previously unlit lighting may be illuminated. In some examples, the lighting may be illuminated via a command to a lighting element transmitted either by the augmented reality visual output device or another computing device.

In some examples, a virtual camera method may be used to determine the virtual presentation for display to the user via the augmented reality visual output device. In some examples, the virtual camera method may include determining a location of the augmented reality visual output device and determining the perspective of the augmented reality visual output device. In various examples, such methods may be performed at the augmented reality visual output device itself, a control device, another computing device, or a cloud computing environment or resource. In any event, the methods discussed herein may substantially exchange using energy intensive lighting elements for the use of less energy intensive computing devices for displaying a space to a user.

FIG. 1 is an illustration of a block diagram of an example system for providing an augmented reality, arranged in accordance with at least some embodiments of the present disclosure. As shown, system 100 may include an augmented reality visual output device 110, such as augmented reality glasses, augmented reality contact lenses, an implanted device, implanted contact lenses, or the like, which may be capable of being worn by and configured to provide a virtual presentation of a space 160 to a user 150. In some examples, augmented reality visual output device 110 may include an opaque augmented reality glasses. System 100 may also include one or more cameras 121-123 configured to record images of space 160, one or more motion detectors 131-133 configured to detect motion in space 160, and/or one or more light sources 141-147 configured to provide illumination within space 160.

In some examples, system 100 may also include a control device 170 configured to determine a virtual presentation of space 160 or a portion of space 160. In general, the virtual presentation may including any suitable virtual presentation. In some examples, the virtual presentation may provide an augmented reality presentation such that the virtual presentation may enhance the perception of user 150. In some examples, the virtual presentation may provide a virtual reality presentation such that the virtual presentation may provide a simulation to user 150. In some examples, control device 170 may determine the virtual presentation of space 160 or portion space 160 based on images of space 160 recorded by cameras 121-123 or received via another image source. In some examples, control device 170 may determine the virtual presentation of space 160 or portion space 160 based on a location and an orientation of augmented reality visual output device 110. In some examples, control device 170 may determine the virtual presentation of space 160 or portion space 160 using virtual camera techniques. In some examples, control device 170 may be configured to switch on light sources 141-147. In some examples, control device 170 may be configured to switch on light sources 141-147 by transmitting a lighting on command. In some examples, control device 170 may be configured to receive an indication of motion from motion detectors 131-133.

In some examples, system 100 may not include control device 170. In some examples, system 100 may instead be configured to communicate with another computing device or a cloud computing environment or resource, any of which may perform the techniques discussed with respect to control device. In some examples, the discussed determination of a virtual presentation of space 160 or portion of space 160 may be performed at augmented reality visual output device 110. In some examples, augmented reality visual output device 110 may include computing devices such as one or more microprocessors, memory, or the like to implement the determination of one or more virtual presentations. As discussed, in various examples, computing may be performed at either control device 170, another computing device, a cloud could computing environment or resource, augmented reality visual output device 110, or combinations thereof. Throughout the discussion herein, it is intended that any computations or determinations discussed with respect to control device 170, augmented reality visual output device 110, another computing device a cloud computing environment or resource may be performed at any of those devices or systems or any combination thereof.

In general, augmented reality visual output device 110 may display a virtual presentation of space 160 or a portion of space 160 while space 160 or the portion of space 160 may remain unlit. By providing a virtual presentation to user 150, energy may be saved as some or all of light sources 141-147 may remain unlit. The virtual presentation may include a presentation of space 160 or the portion of space 160 as it was prior to any motion being detected in space 160 or the portion of space 160. That is, one or more of cameras 121-123 may capture an image or images representative of space 160 or the portion of space 160 and those images may be utilized to provide a virtual presentation to user 150. In some examples, augmented reality visual output device 110 may provide a virtual presentation that substantially represents the field of vision of user 150. In some examples, augmented reality visual output device 110 may provide a virtual presentation that appears as if it were seen directly by user 150. In some examples, augmented reality visual output device 110 may provide a virtual presentation that appear as if it were taken by a camera mounted on the glasses. In some examples, augmented reality visual output device 110 may provide a virtual presentation that includes a virtual presentation blended with an lighted portion of space 160. In some examples, the virtual presentation may include a 3-dimensional (3D) real time model video stream.

When a change or motion in space 160 or the portion of space 160 may be detected, by motion detectors 131-133, for example, space 160 or the portion of space 160 may be lit by one or more of light sources 141-147. During the time space 160 or the portion of space 160 may be lit, cameras 121-123 may capture one or more images of space 160 or the portion of space 160 and may update the virtual presentation. In some examples, a database may be updated with the updated image or images and the virtual presentation for user 150 may be recalculated and updated. In some examples, after the motion has ceased or after a predetermined duration after the motion has ceased, the one or more lit light sources of light sources 141-147 may turned off and user 150 may again be presented with a virtual presentation of space 160 or the portion of space 160. Using such techniques, lighting energy may be substantially saved and, as discussed, lighting or electrical power may be substantially replaced by computing power. As computing power may continue to fall in price, such a transfer from electrical power to computing power may provide substantial savings.

As discussed, in some examples a motion in space 160 or a portion of space may be detected. In some examples, a virtual presentation of a first portion of space 160 may be provided to or determined at augmented reality visual output device 110 for presentation to user 150. In some examples, a motion may be detected in a second portion of space 160. In general, the second portion of space 160 and the first portion of space 160 may include any portions of space 160. In some examples, the second portion of space 160 and the first portion of space 160 may be entirely different portions of space 160. In some examples, the second portion of space 160 and the first portion of space 160 may be the same or substantially the same portions of space 160. In some examples, the second portion of space 160 and the first portion of space 160 may partially overlap. Further, the second portion of space 160 and the first portion of space 160 may define the entirety of space 160 or only a part of space 160. In general, space 160 may include any number of portions and the portions may remain predefined or they may change over time. In some examples, the portions may be defined in real time based on the position of user 150 and any other users in space 160. In general, space 160 may include any suitable space such as a room, a group of rooms, a section of a room, a hall, a factory, a home, a library, an office space or an outdoor area, or the like.

In some examples, the computing power may be substantially provided at a control device 170 of system 100 or another computing device. In general, control device 170 or another computing device may include any suitable computing and communications device such as, for example, a desktop computer, a laptop computer, a server, a handheld computing device, or the like. In some examples, control device 170 or another computing device may include a communications device in communication with a data center or a cloud computing service, or the like. In some examples, control device 170 or another computing device may be implemented as a device discussed with respect to FIG. 5. In some examples, control device 170 or another computing device may be physically coupled to augmented reality visual output device 110. In some examples, control device 170 or another computing device may be physically remote from augmented reality visual output device 110. As is discussed further with respect to FIG. 2, in some examples, control device 170 or another computing device may transmit a virtual presentation to augmented reality visual output device 110. In some examples, control device 170 or another computing device may receive an indication of motion from one or more of motion detectors 131-133. In response to the indication of motion, control device 170 or another computing device may transmit a command to one or more of light sources 141-147 to light space 160 or a portion of space 160.

In some examples, the computing power may be substantially provided at a cloud computing environment or resource. In general, the cloud computing environment or resource may include any suitable computing devices and/or communications device such as, for example, servers, computers, data centers, virtual machines, computing clusters, or the like. In some examples, the cloud computing environment or resource may be physically remote from augmented reality visual output device 110. As is discussed further with respect to FIG. 2, in some examples, the cloud computing environment or resource may transmit a virtual presentation to augmented reality visual output device 110. In some examples, the cloud computing environment or resource may receive an indication of motion from one or more of motion detectors 131-133. In response to the indication of motion, the cloud computing environment or resource may transmit a command to one or more of light sources 141-147 to light space 160 or a portion of space 160.

In some examples, the computing may be provided at augmented reality visual output device 110. In such examples, augmented reality visual output device 110 may include one or more microprocessors, one or more memory devices, and/or one or more communications devices. In some examples, augmented reality visual output device 110 may be implemented as or may include any portions of the device discussed with respect to FIG. 5 and elsewhere herein. As discussed further with respect to FIG. 3, augmented reality visual output device 110 may display a virtual presentation to user 150, receive an indication of motion in a portion of space 160, determine whether the portion of space 160 may be within view of augmented reality visual output device 110 and, if so, may transmit a lighting command to one or more of light sources 141-147.

As discussed, in various examples, augmented reality visual output device 110, cameras 121-123, motion detectors 131-133, light sources 141-147, and, if implemented, control device 170, another computing device, and/or a cloud computing environment or resource may be in communication. In general, the listed devices may be in communication using any suitable coupling, either wired or wireless, and any suitable techniques or protocols. In some examples, one or more of the devices may be in communication over wired Ethernet connections, or the like. In some examples, one or more devices may be in communication over wireless Wi-Fi or Bluetooth connections, or the like. In some examples, all of the implemented devices may use the same or similar communications couplings and/or protocols. In some examples, the control device, the plurality of cameras, the plurality of motion detectors, and the plurality of light sources may be wirelessly communicatively coupled. In some examples, some implemented devices may use different communications couplings and/or protocols.

In general, cameras 121-123 may include any suitable image capture device or devices. In some examples, cameras 121-123 may include one or more digital image capture devices. In some examples, cameras 121-123 may include one or more digital cameras. In some examples, cameras 121-123 may include one or more digital video cameras. In some examples, cameras 121-123 may include one or more cameras on a chip. In some examples, cameras 121-123 may include one or more cameras capable of capturing an image using illumination less than that which would provide adequate illumination for a person. In such examples, cameras 121-123 may be considered more sensitive than a human eye. In some examples, cameras 121-123 may be placed on an automatically rotatable or moveable platform such that the camera may be panned or rotated to increase its field of view. In general, any number of cameras may be used for a space. In some examples, the number of cameras used may depend on their type, the size of the space, and the configuration of the space, or the like. In some examples, 1 to 10 cameras may be used. In some examples, 5 to 15 cameras be used. In some examples, 15 or more cameras may be used. As will be appreciated, cameras may become substantially ubiquitous over time. In some examples, cameras 121-123 may have been installed and/or operated for other purposes (e.g., surveillance) and may be subsequently incorporated into system 100.

In general, motion detectors 131-133 may include any suitable motion detector or motion sensor devices. In various examples, motion detectors 131-133 may include one or more acoustic sensors, one or more optical sensors, one or more infrared sensors, one or more reflection of transmitted energy (infrared, ultrasonic, etc.) sensors, one or more electromagnetic induction sensors, one or more vibration sensors, or the like. In general, any number of motion detectors may be used for a space. In some examples, the number of motion detectors used may depend on their type, the size of the space, and the configuration of the space, or the like. In some examples, 1 to 10 motion detectors may be used. In some examples, 5 to 15 motion detectors be used. In some examples, 15 or more motion detectors may be used. In some examples, motion detectors 131-133 may be implemented using cameras 121-123, that is, using image recognition techniques or the like and separate motion detectors 131-133 may not be implemented as a part of system 100. In some examples, a subset of motion detectors may be kept inactive and may be activated by other motion detectors. For example, a group of always on motion detectors may activate other usually off motion detectors upon the always on motion detector detecting motion. Such implementations may provide additional power savings.

In general, light sources 141-147 may include any suitable light sources. In various examples, light sources 141-147 may include overhead lights, lamps, bulbs, light emitting diodes, desktop lights, or the like. In some examples, light sources 141-147 may be battery powered. In some examples, light sources 141-147 may include micro light sources such as a multiple number of light emitting diodes or light emitting diode arrays, or the like. In general, any number of light sources may be used for a space. In some examples, the number of light sources used may depend on their type, the size of the space, and the configuration of the space, or the like. In some examples, 1 to 10 light sources may be used. In some examples, 10 to 50 light sources be used. In some examples, 50 or hundreds or more light sources may be used.

Figure 2:
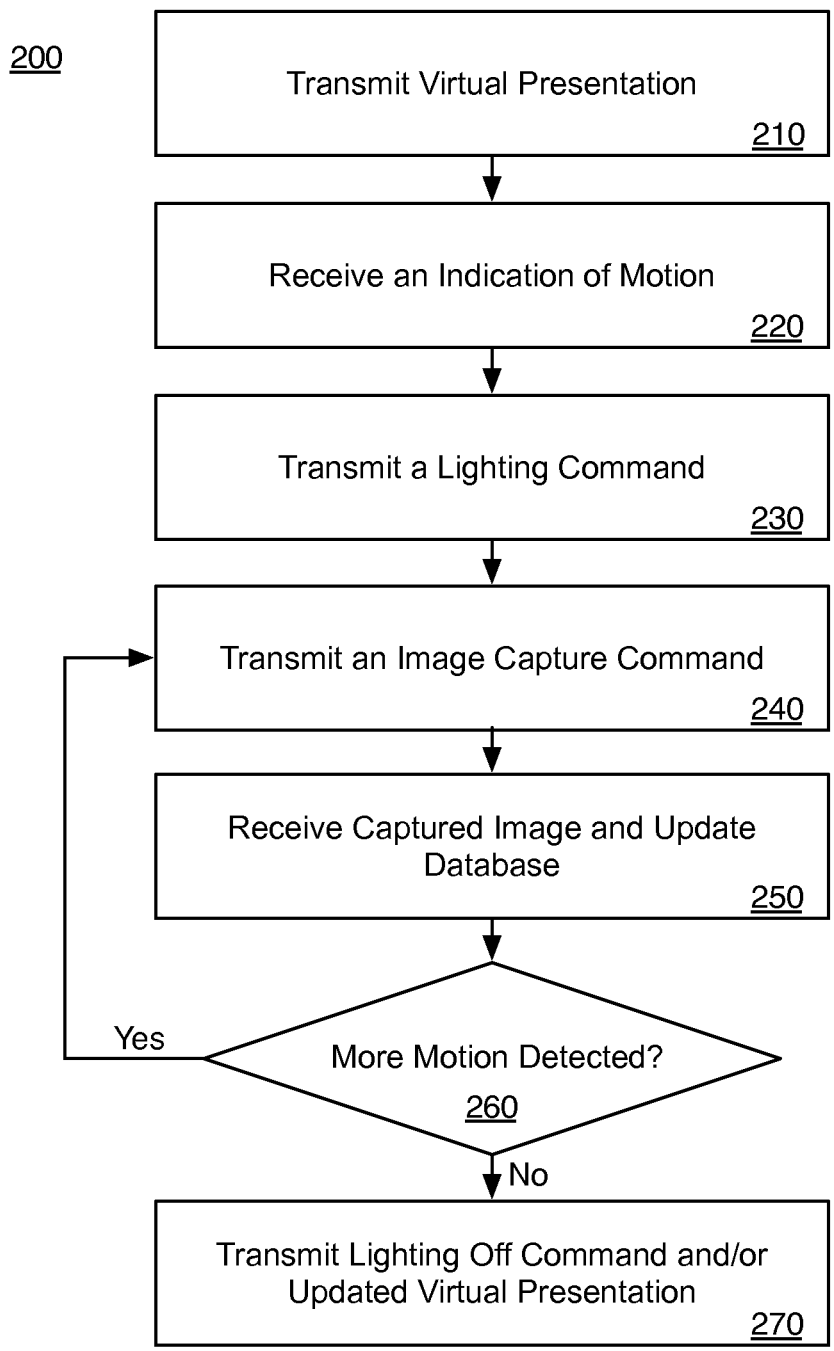
FIG. 2 is an illustration of a flow diagram of an example method for providing an augmented reality.

FIG. 2 is an illustration of a flow diagram of an example method 200 for providing an augmented reality, arranged in accordance with at least some embodiments of the present disclosure. In general, method 200 may be performed by any suitable device, devices, or system such as those discussed herein. In some examples, method 200 may be performed by control device 170. In some examples, method 200 may be performed by a computing device such as a server, desktop computer, laptop computer, netbook device, tablet device, or the like. In some examples, method 200 may be performed by a cloud computing environment or resource. Method 200 sets forth various functional blocks or actions that may be described as processing steps, functional operations, events and/or acts, etc., which may be performed by hardware, software, and/or firmware. Numerous alternatives to the functional blocks shown in FIG. 2 may be practiced in various implementations. For example, intervening actions not shown in FIG. 2 and/or additional actions not shown in FIG. 2 may be employed and/or some of the actions shown in FIG. 2 may be eliminated, without departing from the scope of claimed subject matter. Method 200 may include one or more of functional operations as indicated by one or more of blocks 210, 220, 230, 240, 250, 260, and/or 270. The process of method 200 may begin at block 210.

At block 210, "Transmit Virtual Presentation", a virtual presentation may be transmitted. In some examples, the virtual presentation may be transmitted from control device 170 to augmented reality visual output device 110. In general, the virtual presentation may include any suitable information representative of a space or a portion of a space. In some examples, the virtual presentation may include a presentation of a portion of a space that may be substantially unlit. In some examples, transmitting the virtual presentation may include transmitting a streaming video. In some examples, transmitting the virtual presentation may include transmitting a streaming video that appears as if taken from a camera at an augmented reality visual output device. In some examples, a content of the streaming video may change based on a changing location and/or orientation of the augmented reality visual output device to which the virtual presentation may be transmitted. In some examples, the changing location and/or orientation may be determined based on received location and orientation indications from the augmented reality visual output device. In some examples, a series of virtual presentations may be provided as the user moves about a space. In some examples, the virtual presentation may have been previously determined using the techniques discussed with respect to FIG. 4 or elsewhere herein. As will be appreciated, the one or more virtual presentations may be transmitted over any duration of time. In some examples, the one or more virtual presentations may be transmitted until a motion may be detected in the space. The process of method 200 may continue at block 220.

At block 220, "Receive an Indication of Motion", an indication of motion may be received. In some examples, the indication of motion may be received from a motion detector. In some examples, the indication of motion may be received from one or more of motion detectors 131-133. In general, the indication of motion may be received using any suitable technique or techniques. In some examples, the indication of motion may be indicative of a motion within the space being presented to a user as a virtual presentation. In some examples, the indication of motion may be indicative of a motion outside the space being presented to a user as a virtual presentation. In some examples, the indication of motion may be indicative of a motion adjacent to the space being presented to a user as a virtual presentation. In some examples, the indication of motion may be indicative of a motion by the user being presented the virtual presentation.

In some examples, the indication of motion may be indicative of a motion that may alter a space within view or nearly within view of the user such that a virtual presentation being presented to the user may no longer accurately represent the space. In some examples, a determination may be made based on the received indication of motion as to whether the motion may cause the virtual presentation being presented to the user may no longer accurately represent the space. In some examples, such a determination may be made based on the virtual representation and a projected location of the motion. The process of method 200 assumes the indication of motion may require a change for the user. If the indication of motion may not require change for the user, the indication of motion may be discarded and the process of method 200 may return to block 210. The process of method 200 may continue at block 230.

At block 230, "Transmit a Lighting Command", a lighting command may be transmitted. In some examples, the lighting command may be transmitted to one or more of light sources 141-147. In general, the lighting command may be transmitted using any suitable technique or techniques. In some examples, the lighting command may be a light on command. In some examples, the lighting command may indicate a subset of light sources 141-147 that may be illuminated. In some examples, the lighting command may indicate a subset of micro-lighting elements that may be illuminated. In some examples, the lighting command may be configured to illuminate a portion of a space. In some examples, the portion of the space may include all or part of the space being presented to the user as a virtual presentation. In some examples, the portion of the space may include all or part of a space adjacent to the space being presented to the user as a virtual presentation. In some examples, the portion of the space may include all or part of the space being presented to the user as a virtual presentation. In such examples, the presentation to the user may include a composite of the virtual presentation and partially illuminated space. The process of method 200 may continue at block 240.

At block 240, "Transmit an Image Capture Command", an image capture command may be transmitted. In some examples, the image capture command may be transmitted to one or more of cameras 121-123. In general, the image capture may be transmitted using any suitable technique or techniques. In some examples, the image capture command may be transmitted with the transmit lighting command. In some examples, the image capture command may be transmitted after the transmit lighting command. In some examples, the image capture command may either be transmitted or include a delay command such that a delayed image capture may be made. Such a delay technique may provide for the motion causing the need for an updated image capture to be substantially completed. The process of method 200 may continue at block 250.

At block 250, "Receive Captured Image and Update Database", one or more images may be received and an image database may be updated with the one or more received images. In some examples, the images may be received from one or more of cameras 121-123. In general, the images may be received and the image database may be updated using any suitable technique or techniques. In some examples, the image database may be updated for a future virtual presentation. The process of method 200 may continue at decision block 260.

At decision block 260, "More Motion Detected?", it may be determined whether more motion has been detected. In general, it may be determined whether more motion has been detected using any suitable technique or techniques. In some examples, after a predetermined duration, if no indications of motion may have been received, it may be determined that no more motion has been detected. If more motion has been detected, the process of method 200 may continue at block 240 such that updated images of a space or a portion of a space may be requested and received. In general, more motion may be detected over any duration as motion persists in the space or portion of a space. If more motion has not been detected for a predetermined duration, the process of method 200 may continue at block 270.

At block 270, "Transmit Lighting Off Command and/or Updated Virtual Presentation", a lighting off command and/or an updated virtual presentation may be transmitted. In general, the lighting off command and or updated virtual presentation may be transmitted using any suitable technique or techniques. In some examples, the lighting off command and/or updated virtual presentation may be transmitted substantially simultaneously. In some examples, the updated virtual presentation may first be transmitted and the lighting off command may be subsequently transmitted. In some examples, the lighting off command or the subsequent transmission of the lighting off command may be configured such that the lights or subset of lights may be turned off after the augmented reality visual output device may have had a time duration sufficient to load and/or present the virtual presentation to the user. In some examples, the lighting off command may be transmitted after a virtual presentation confirmation has been received from the augmented reality visual output device. For safety purposes, in some examples, the lighting off command may be transmitted only after receiving an indication from the user that it may be safe for the light sources to be turned off. In some examples, the process of method 200 may return to block 210.

As will be appreciated, the process of method 200 may be implemented for any number of users in a space and the process may be at any block of method 200 for the various users. As discussed, in some examples, the process of method 200 may be performed by control device 170. In some examples, a single control device may support a single space or room. In some examples, a single control device may support multiple rooms. In some examples, multiple control devices may support a single or multiple rooms and, in such examples, the multiple control devices may be in communication to support the implementation.

Figure 3:
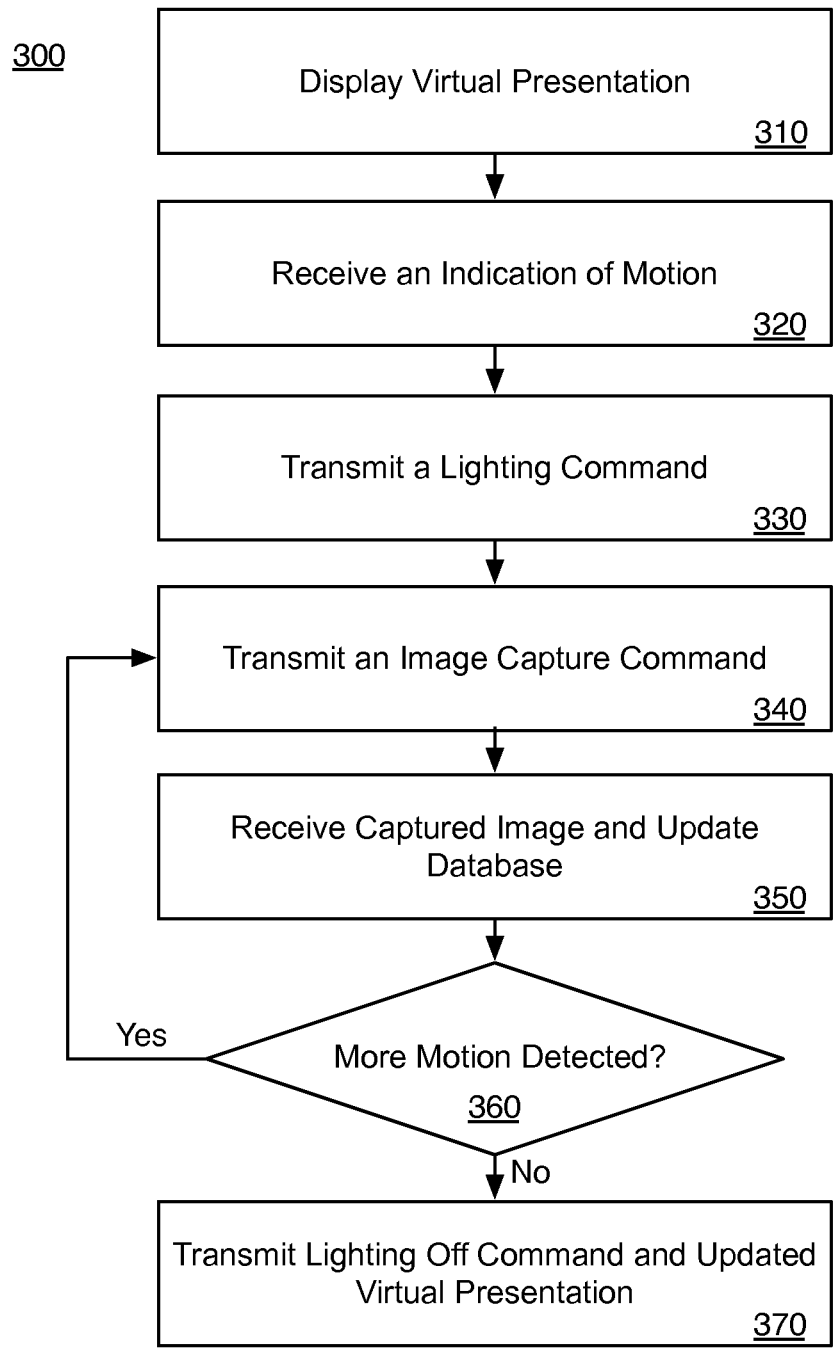
FIG. 3 is an illustration of a flow diagram of an example method for providing an augmented reality.

FIG. 3 is an illustration of a flow diagram of an example method 300 for providing an augmented reality, arranged in accordance with at least some embodiments of the present disclosure. In general, method 300 may be performed by any suitable device, devices, or system such as those discussed herein. In some examples, method 300 may be performed by augmented reality visual output device 110. Method 300 sets forth various functional blocks or actions that may be described as processing steps, functional operations, events and/or acts, etc., which may be performed by hardware, software, and/or firmware. Numerous alternatives to the functional blocks shown in FIG. 3 may be practiced in various implementations. For example, intervening actions not shown in FIG. 3 and/or additional actions not shown in FIG. 3 may be employed and/or some of the actions shown in FIG. 3 may be eliminated, without departing from the scope of claimed subject matter. Method 300 may include one or more of functional operations as indicated by one or more of blocks 310, 320, 330, 340, 350, 360, and/or 370. The process of method 300 may begin at block 310.

At block 310, "Display Virtual Presentation", a virtual presentation may be displayed to a user. In some examples, the virtual presentation may be displayed to user 150 via augmented reality visual output device 110. In general, the virtual presentation may include any suitable information representative of a space or a portion of a space. In some examples, the virtual presentation may include a presentation of a portion of a space that may be substantially unlit. In some examples, displaying the virtual presentation may include displaying a streaming video. In some examples, displaying the virtual presentation may include displaying a streaming video that appears as if taken from a camera at an augmented reality visual output device. In some examples, displaying the virtual presentation may include displaying a still image or multiple still images. In some examples, a content of the streaming video may change based on a changing location and/or orientation of the augmented reality visual output device to which the virtual presentation may be transmitted. In some examples, the changing location and/or orientation may be determined based on accelerometers provided within the augmented reality visual output device. In some examples, the changing location and/or orientation may be determined based on signals received from positional transmitters. In some examples, a series of virtual presentations may be displayed to the user as the user moves about a space. In some examples, the virtual presentation may have been previously determine using the techniques discussed with respect to FIG. 4 or elsewhere herein. The process of method 300 may continue at block 320.

At block 320, "Receive an Indication of Motion", an indication of motion may be received. In some examples, the indication of motion may be received from a motion detector. In some examples, the indication of motion may be received from one or more of motion detectors 131-133. In general, the indication of motion may be received using any suitable technique or techniques. In some examples, the indication of motion may be indicative of a motion within the space being presented to a user as a virtual presentation. In some examples, the indication of motion may be indicative of a motion outside the space being presented to a user as a virtual presentation. In some examples, the indication of motion may be indicative of a motion adjacent to the space being presented to a user as a virtual presentation. In some examples, the indication of motion may be indicative of a motion by the user being presented a virtual presentation.

In some examples, the indication of motion may be indicative of a motion that may alter a space within view or nearly within view of the user such that a virtual presentation being presented to the user may no longer accurately represent the space. In some examples, a determination may be made based on the received indication of motion as to whether the motion may cause the virtual presentation being presented to the user may no longer accurately represent the space. In some examples, such a determination may be made based on the virtual representation and a projected location of the motion. The process of method 300 assumes the indication of motion may require a change for the user. If the indication of motion may not require change for the user, the indication of motion may be discarded and the process of method 300 may return to block 310. The process of method 300 may continue at block 330.

At block 330, "Transmit a Lighting Command", a lighting command may be transmitted. In some examples, the lighting command may be transmitted to one or more of light sources 141-147. In general, the lighting command may be transmitted using any suitable technique or techniques. In some examples, the lighting command may be a light on command. In some examples, the lighting command may indicate a subset of light sources 141-147 that may be illuminated. In some examples, the lighting command may indicate a subset of micro-lighting elements that may be illuminated. In some examples, the lighting command may be configured to illuminate a portion of a space. In some examples, the portion of the space may include all or part of the space being presented to the user as a virtual presentation. In some examples, the portion of the space may include all or part of a space adjacent to the space being presented to the user as a virtual presentation. In some examples, the portion of the space may include all or part of the space being presented to the user as a virtual presentation. In such examples, the presentation to the user may include a composite of the virtual presentation and partially illuminated space. The process of method 300 may continue at block 340.

At block 340, "Transmit an Image Capture Command", an image capture command may be transmitted. In some examples, the image capture command may be transmitted to one or more of cameras 121-123. In general, the image capture may be transmitted using any suitable technique or techniques. In some examples, the image capture command may be transmitted with the transmit lighting command. In some examples, the image capture command may be transmitted after the transmit lighting command. In some examples, the image capture command may either be transmitted or include a delay command such that a delayed image capture may be made. Such a delay technique may provide for the motion causing the need for an updated image capture to be substantially completed. The process of method 300 may continue at block 350.

At block 350, "Receive Captured Image and Update Database", one or more images may be received and an image database may be updated with the one or more received images. In some examples, the images may be received from one or more of cameras 121-123. In general, the images may be received and the image database may be updated using any suitable technique or techniques. In some examples, the image database may be updated for a future virtual presentation. The process of method 300 may continue at decision block 360.

At decision block 360, "More Motion Detected?", it may be determined whether more motion has been detected. In general, it may be determined whether more motion has been detected using any suitable technique or techniques. In some examples, after a predetermined duration, if no indications of motion may have been received, it may be determined that no more motion has been detected. If more motion has been detected, the process of method 300 may continue at block 340 such that updated images of a space or a portion of a space may be requested and received. In general, more motion may be detected over any duration as motion persists in the space or portion of a space. If more motion has not been detected for a predetermined duration, the process of method 300 may continue at block 370.

At block 370, "Transmit Lighting Off Command and/or Updated Virtual Presentation", a lighting off command and/or an updated virtual presentation may be transmitted. In general, the lighting off command and or updated virtual presentation may be transmitted using any suitable technique or techniques. In some examples, the lighting off command and/or updated virtual presentation may be transmitted substantially simultaneously. In some examples, the updated virtual presentation may first be transmitted and the lighting off command may be subsequently transmitted. In some examples, the lighting off command or the subsequent transmission of the lighting off command may be configured such that the lights or subset of lights may be turned off after the augmented reality visual output device may have had a time duration sufficient to load and/or present the virtual presentation to the user. In some examples, the lighting off command may be transmitted after a virtual presentation confirmation has been received from the augmented reality visual output device. For safety purposes, in some examples, the lighting off command may be transmitted only after receiving an indication from the user that it may be safe for the light sources to be turned off. In some examples, the process of method 300 may return to block 310.

As discussed with respect to FIGS. 2 and 3, in some examples, after a received indication of detected motion, a lighting on command may be transmitted to a lighting element. Further as discussed, in some examples, the discussed techniques and systems may support multiple users. In some examples, an indication of a second user in a space or a portion of a space may be received at a control device, another computing device, a cloud computing environment, or an augmented reality visual output device, as discussed herein. In some examples, any of those devices or systems may determine whether the second user is within a predetermined distance of the first user. If the second user is within the predetermined distance of the first user, a lighting on command may be transmitted to a lighting element to illuminate the first user and the second user.

Figure 4:
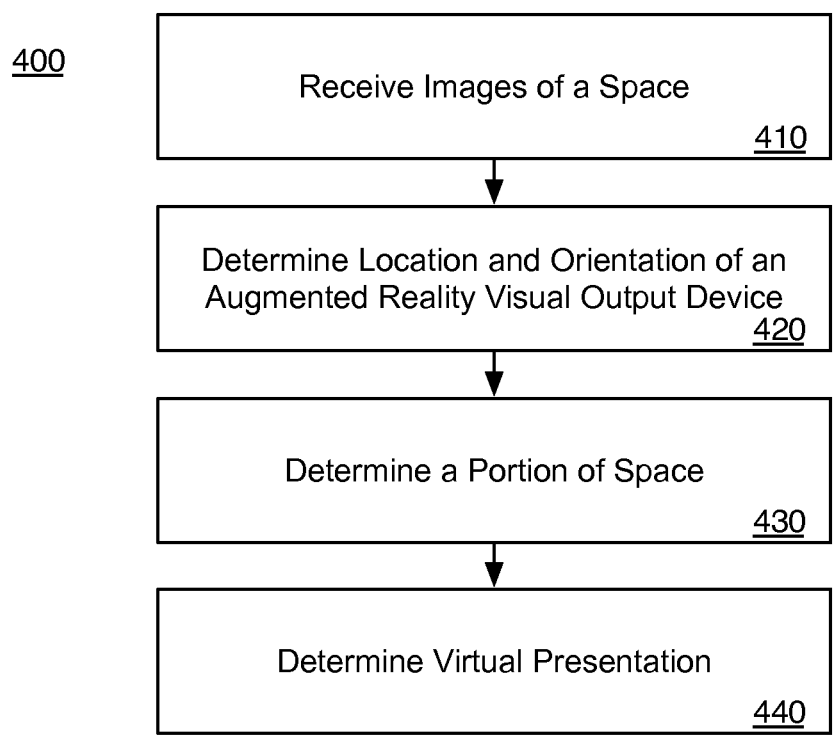
FIG. 4 is an illustration of a flow diagram of an example method for providing an augmented reality.

FIG. 4 is an illustration of a flow diagram of an example method 400 for providing an augmented reality, arranged in accordance with at least some embodiments of the present disclosure. In general, method 400 may be performed by any suitable device, devices, or system such as those discussed herein. In some examples, method 400 may be performed by control device 170. In some examples, method 400 may be performed by a computing device such as a server, desktop computer, laptop computer, netbook device, tablet device, or the like. In some examples, method 400 may be performed by augmented reality visual output device 110. Method 400 sets forth various functional blocks or actions that may be described as processing steps, functional operations, events and/or acts, etc., which may be performed by hardware, software, and/or firmware. Numerous alternatives to the functional blocks shown in FIG. 4 may be practiced in various implementations. For example, intervening actions not shown in FIG. 4 and/or additional actions not shown in FIG. 4 may be employed and/or some of the actions shown in FIG. 4 may be eliminated, without departing from the scope of claimed subject matter. Method 400 may include one or more of functional operations as indicated by one or more of blocks 410, 420, 430, and/or 440. The process of method 400 may begin at block 410.

At block 410, "Receive Images of a Space", images of a space or a portion of a space may be received. In general, the images may be received using any suitable technique or techniques. In general, the images may include any suitable images in any suitable file format. In some examples, the images may be still images. In some examples, the images may be video images. In some examples, the images may be received from one or more cameras. In some examples, the images may be received by cameras 121-123. In some examples, a multiple number of images of a space may be received from a multiple number of cameras. In some examples, the images may be received from another device or devices having an image database. The process of method 400 may continue at block 420.

At block 420, "Determine Location and Orientation of an Augmented Reality Visual Output Device", a location and orientation of an augmented reality visual output device within a space or a portion of a space may be determined. In general, the location and orientation of an augmented reality visual output device may be determined using any suitable technique or techniques. In some examples, the location and orientation of an augmented reality visual output device may be determined at a control device. In some examples, the location and orientation of an augmented reality visual output device may be determined at an augmented reality visual output device. In some examples, the location and orientation of an augmented reality visual output device may be determined using a global positioning system. In some examples, the location and orientation of an augmented reality visual output device may be determined using accelerometers within an augmented reality visual output device. The process of method 400 may continue at block 430.

At block 430, "Determine a Portion of Space", a space or a portion of a space may be determined. In general, the space or portion of space may be determined using any suitable technique or techniques. In some examples, the space or portion of space may be determined may be determined at a control device. In some examples, the space or portion of space may be determined at an augmented reality visual output device. In some examples, the space or portion of space may be determined using a virtual camera technique such that the space or portion of space may include the space or portion of space that would be viewable if a camera were placed in a similar or the same location and orientation as that of the augmented reality visual output device. In some examples, the space or portion of space may be determined based on the location and orientation of the augmented reality visual output device. The process of method 400 may continue at block 440.

At block 440, "Determine Virtual Presentation", a virtual presentation may be determined. In general, the virtual presentation may be determined using any suitable technique or techniques. In some examples, the virtual presentation may be determined at a control device. In some examples, the virtual presentation may be determined at an augmented reality visual output device. In some examples, the virtual presentation may be determined using a virtual camera technique such that the virtual presentation may include the virtual presentation that would be viewable if a camera were viewing a similar or the same space or portion of space as that of the augmented reality visual output device. In some examples, the virtual presentation may be determined based on the multiple number of images, and the determined space or portion of space. In some examples, the virtual presentation may be determined based on the multiple number of images, the determined space or portion of space, and a virtual camera determination technique.

As discussed herein, the virtual presentation may provide a user a view of a substantially unlit space or a portion of space. In some examples, the virtual presentation may include a video stream that looks as if taken by a physical camera at the location of an augmented reality visual output device. In some examples, the virtual presentation may be formed from a virtual camera technology which may create a 3-dimensional (3D) real time model of a space or a portion of a space. In some examples, the virtual presentation may include a feed for an augmented reality visual output device such that the feed may be displayed to a user. Further, as discussed herein, a motion or motions may cause an unlit space or portion of a space to be illuminated. Subsequently, the light sources may be turned off and a recalculated virtual presentation may be provided to the augmented reality visual output device for display to the user.

As discussed herein a space may include any suitable space such as a room, a group of rooms, a hall, a factory, a home, a library, an office space or an outdoor area, or the like. In some examples, a typical room may be divided into an area or areas in which action (motion) rarely occurs and an area or areas in which action (motion) commonly occurs. The area or areas in which action commonly occurs may be lighted and the areas or areas in which action rarely occurs may be unlit and views of those areas may be provided via virtual presentation. For example, in an office area, a computing and desk area may be illuminated while the remainder of the room may be unlit. A worker may substantially not notice the unlit or dim area due to that area being presented via virtual presentation.

Further, the methods and techniques discussed herein may be applicable in emergency situations. For example, in smoky or areas with power outages, emergency workers, such as police or fire fighters, having augmented reality visual output devices may be provided a virtual presentation of the space at the last time images of the area were captured. In some examples, a virtual presentation of the space at the last time images of the area were captured may be provided although motion has occurred in the interim. Such a "best presentation" or "best guess presentation" may provide useful information to emergency workers although the presentation may be imperfect.

FIG. 5 is an illustration of an example computer program product 500, arranged in accordance with at least some embodiments of the present disclosure. Computer program product 500 may include machine readable non-transitory medium having stored therein a plurality of instructions that, when executed, cause the machine to provide web tracking protection according to the processes and methods discussed herein. In some examples, computer program product 500 may include instructions that may be executed by control device 170. In some examples, computer program product 500 may include instructions that may be executed by augmented reality visual output device 110. Computer program product 500 may include a signal bearing medium 502. Signal bearing medium 502 may include one or more machine-readable instructions 504, which, when executed by one or more processors, may operatively enable a computing device to provide the functionality described herein. In some examples, machine-readable instructions 504 may be provided as web browser software. In some examples, machine-readable instructions 504 may be provided as a web browser plug-in. In various examples, some or all of the machine-readable instructions may be used by the devices discussed herein.

In some implementations, signal bearing medium 502 may encompass a computer-readable medium 506, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communication link, a wireless communication link, etc.). In some examples, signal bearing medium 502 may encompass a machine readable non-transitory medium.

Figure 6:
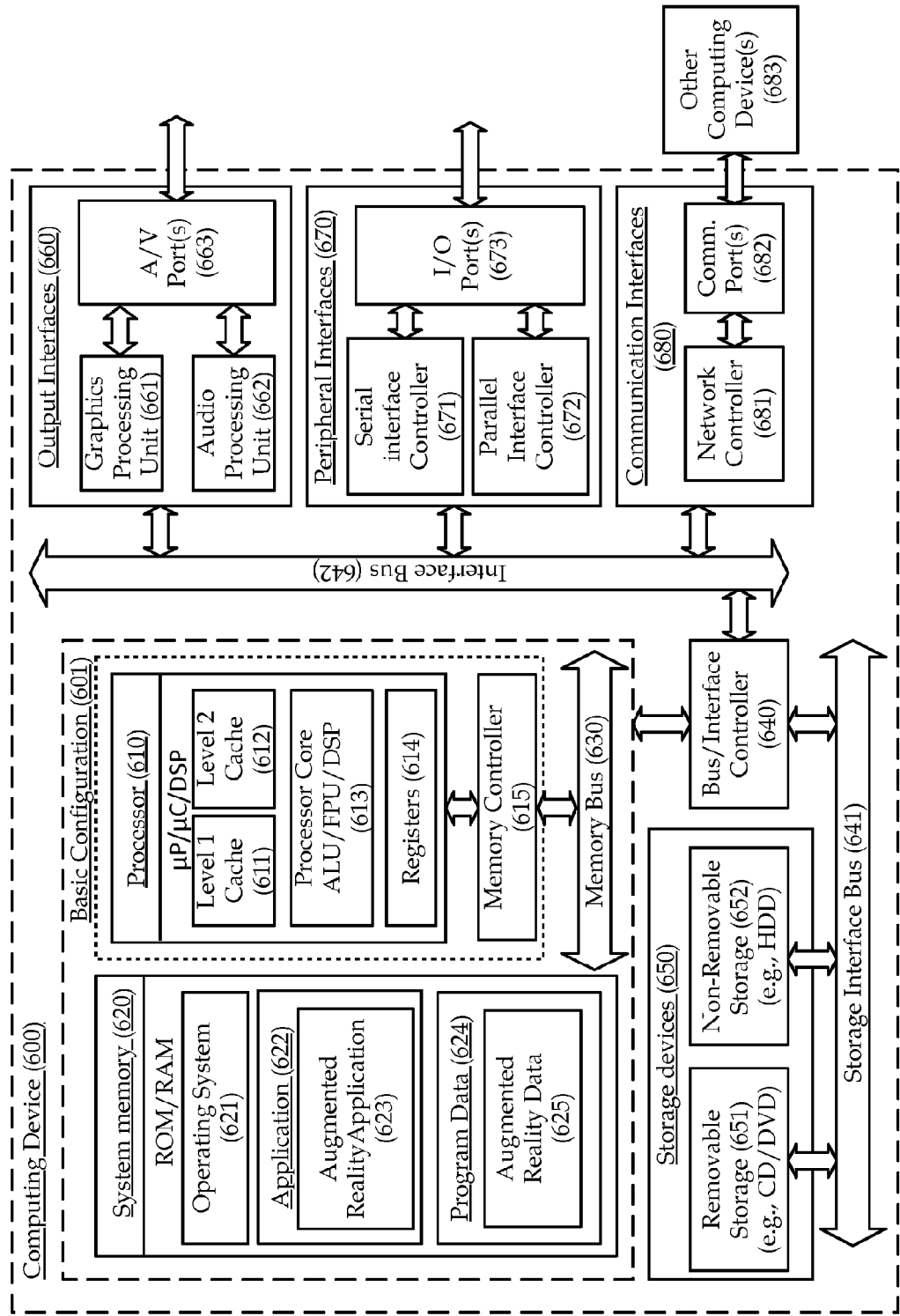
FIG. 6 is an illustration of a block diagram of an example computing device, all arranged in accordance with at least some embodiments of the present disclosure.

FIG. 6 is a block diagram illustrating an example computing device 600, arranged in accordance with at least some embodiments of the present disclosure. In various examples, computing device 600 may be configured to provide an augmented reality as discussed herein. In some examples, all or portions of computing device 600 may implemented as control device 170. In some examples, all or portions of computing device 600 may implemented as augmented reality visual output device 110. In one example basic configuration 601, computing device 600 may include one or more processors 610 and system memory 620. A memory bus 630 can be used for communicating between the processor 610 and the system memory 620.

Depending on the desired configuration, processor 610 may be of any type including but not limited to a microprocessor (µP), a microcontroller (µC), a digital signal processor (DSP), or any combination thereof. Processor 610 can include one or more levels of caching, such as a level one cache 611 and a level two cache 612, a processor core 613, and registers 614. The processor core 613 can include an arithmetic logic unit (ALU), a floating point unit (FPU), a digital signal processing core (DSP Core), or any combination thereof. A memory controller 615 can also be used with the processor 610, or in some implementations the memory controller 615 can be an internal part of the processor 610.

Depending on the desired configuration, the system memory 620 may be of any type including but not limited to volatile memory (such as RAM), non-volatile memory (such as ROM, flash memory, etc.) or any combination thereof. System memory 620 may include an operating system 621, one or more applications 622, and program data 624. Application 622 may include augmented reality application 623 that can be arranged to perform the functions, actions, and/or operations as described herein including the functional blocks, actions, and/or operations described herein. Program Data 624 may include augmented reality data 625 for use with augmented reality application 623. In some example embodiments, application 622 may be arranged to operate with program data 624 on an operating system 621. This described basic configuration is illustrated in FIG. 6 by those components within dashed line 601.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of device 600.

Computing device 600 may also include an interface bus 642 for facilitating communication from various interface devices (e.g., output interfaces, peripheral interfaces, and communication interfaces) to the basic configuration 601 via the bus/interface controller 640. Example output interfaces 660 may include a graphics processing unit 661 and an audio processing unit 662, which may be configured to communicate to various external devices such as a display or speakers via one or more A/V ports 663. Example peripheral interfaces 670 may include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which may be arranged to facilitate communications with one or more other computing devices 683 over a network communication via one or more communication ports 682. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 600 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. In addition, computing device 600 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for providing an augmented reality comprising:
   capturing a real image from information contained in a visible light;
   generating a virtual image from the captured image;
   displaying on an augmented reality device a view selected from the group consisting of the real image and the virtual image;
   displaying the view of the real image in response to detection of a motion; and
   displaying the view of the virtual image in the absence of detected motion.

2. The method of claim 1:
   wherein the capture of the real image is by a camera; and
   wherein the generation of the virtual image from the captured image is by a processor executing an instance of an augmented reality application.

3. The method of claim 2:
   wherein the camera is movably located at a local site.

4. The method of claim 3:
   wherein the visible light containing the information from which the real image is captured originates from a light source.

5. The method of claim 4:
   wherein the display of the real image includes activating the light source and the camera and deactivating the virtual reality generator; and
   wherein the display of the virtual image includes deactivating the light source and the camera and activating the virtual reality generator.

6. The method of claim 5 further comprising:
   storing the captured real image in a storage device; and
   requesting the captured real image from the storage device for display as the virtual image on the augmented reality device.

7. The method of claim 6:
   wherein the storage device resides in a device selected from the group consisting of the augmented reality device, a control device, a computing device, and a cloud computer.

8. The method of claim 6 further comprising:
   determining a real orientation of the augmented reality device relative to a projection space;
   determining an orientation of the augmented reality device relative to a virtual image;
   orienting the virtual image displayable on the augmented reality device to the user in response to the real orientation of the augmented reality device; and
   displaying the oriented virtual image on the augmented reality device.

9. The method of claim 6 further comprising:
   determining an orientation of the augmented reality device within a space or a portion of a space;
   determining an orientation of the augmented reality device relative to a virtual image;
   displaying the virtual image in the absence of a motion if the orientation of the augmented reality device within a space or a portion of a space and the orientation of the augmented reality device to a virtual image are the same; and
   displaying the real image if the orientation of the augmented reality device within a space or a portion of a space is changed from the orientation of the augmented reality device to a virtual image.

10. The method of claim 6 further comprising:
    determining a lighting condition by the light source of a space;
    displaying a composite of the virtual image and the real image in the absence of a motion under partial lighting conditions.

11. The method of claim 6 further comprising:
    determining an interval of time after detection of a motion;
    maintaining the display of the view of the real image during the interval of time;
    determining a second motion within the interval of time;
    continuing the display of the view of the real image on detection of the second motion for one or more additional intervals of time;

continuing the display of the view of the real image on detection of a subsequent motion within the one or more additional intervals of time; and wherein the absence of detected motion is the absence of the second motion within the interval of time or the absence of the subsequent motions within the one or more additional intervals of time.

12. An augmented reality device comprising:
a light source for illuminating a space, the visible light containing space information;
a camera for capturing a real image from information in the visible light;
a motion detector for detecting motion within the space;
an augmented reality application for generating a virtual image from the captured real image;
a display for displaying a view selected from the group consisting of the real image and the virtual image;
a processor operatively coupled to the light source, the camera, the motion detector, and the display; the processor executing an instance of the augmented reality application to generate the virtual image;
wherein the processor is configured by the augmented reality application to activate the light source and the camera and deactivate the virtual reality generator in response to a signal from the motion detector indicating motion;
wherein the processor is configured to deactivate the light source and the camera and activate the virtual reality generator in response to the absence of motion.

13. The augmented reality device of claim 12:
wherein the camera is movably located at a local site.

14. The augmented reality device of claim 12 further comprising:
a storage device for storing the captured real image.

15. The augmented reality device of claim 14:
wherein the storage device resides in a device selected from the group consisting of the augmented reality device, a control device, a computing device, and a cloud computer.

16. The augmented reality device of claim 15:
wherein the augmented reality device is a device selected from the group consisting of glasses, augmented reality contact lenses, an implanted device, implanted contact lenses, and devices capable of being worn by and configured to provide a virtual presentation of a space to a user.

17. The augmented reality device of claim 16:
wherein the processor is configured by the augmented reality application to:
determine a real orientation of the augmented reality device relative to a projection space;
determine an orientation of the augmented reality device relative to a virtual image; and
orient the virtual image displayable on the augmented reality device to the user in response to the real orientation of the augmented reality device.

18. The augmented reality device of claim 16:
wherein the processor is configured by the augmented reality application to:
determine an orientation of the augmented reality device within a space or a portion of a space;
determine an orientation of the augmented reality device relative to a virtual image;
display the virtual image in the absence of a motion if the orientation of the augmented reality device within a space or a portion of a space and the orientation of the augmented reality device to a virtual image are the same; and display the real image if the orientation of the augmented reality device within a space or a portion of a space is changed from the orientation of the augmented reality device to a virtual image.

19. The augmented reality device of claim 16:
wherein the processor is configured by the augmented reality application to:
determine a lighting condition of a space by the light source; and
display a composite of the virtual image and the real image in the absence of a motion under partial lighting conditions.

20. The augmented reality device of claim 16:
wherein the processor is configured by the augmented reality application to:
determine an interval of time after detection of a motion;
maintain the display of the view of the real image during the interval of time;
determine a second motion within the interval of time;
continue the display of the view of the real image on detection of the second motion for one or more additional intervals of time;
continue the display of the view of the real image on detection of a subsequent motion within the one or more additional intervals of time; and
wherein the absence of detected motion is the absence of the second motion within the interval of time or the absence of the subsequent motions within the one or more additional intervals of time.

21. The augmented reality device of claim 16:
wherein the camera is a camera on a chip.

22. The augmented reality device of claim 16:
wherein the light source is a micro light source.

23. The augmented reality device of claim 16 further comprising:
a communication interface for communication with other computing devices.

24. A non-transitory computer readable medium storing instructions which when executed by a processor causes the processor to perform a method for augmenting reality comprising:
capturing a real image from information contained in a visible light;
generating a virtual image from the captured image;
displaying on an augmented reality device a view selected from the group consisting of the real image and the virtual image;
displaying the view of the real image in response to detection of a motion; and
displaying the view of the virtual image in the absence of detected motion.

25. The non-transitory computer readable medium of claim 24:
wherein the display of the real image includes activating a light source and a camera for capturing the real image and deactivating the virtual reality generator; and
wherein the display of the virtual image includes deactivating the light source and the camera and activating the virtual reality generator.

26. The non-transitory computer readable medium of claim 25, the method further comprising:
determining a real orientation of the augmented reality device relative to a projection space;
determining an orientation of the augmented reality device relative to a virtual image;

orienting the virtual image displayable on the augmented reality device to the user in response to the real orientation of the augmented reality device.

27. The non-transitory computer readable medium of claim 25, the method further comprising:
determining an illumination by the light source of a space;
displaying a composite of the virtual image and the real image in the absence of a motion under partial lighting conditions.

28. The non-transitory computer readable medium of claim 25, the method further comprising:
determining an interval of time after detection of a motion;
maintaining the display of the view of the real image during the interval of time;
determining a second motion within the interval of time;
continuing the display of the view of the real image on detection of the second motion for one or more additional intervals of time;
continuing the display of the view of the real image on detection of a subsequent motion within the one or more additional intervals of time; and
wherein the absence of detected motion is the absence of the second motion within the interval of time or the absence of the subsequent motions within the one or more additional intervals of time.

* * * * *

UNITED STATES PATENT AND TRADEMARK OFFICE
CERTIFICATE OF CORRECTION

| | | |
|---|---|---|
| PATENT NO. | : 9,196,094 B2 | Page 1 of 1 |
| APPLICATION NO. | : 13/989858 | |
| DATED | : November 24, 2015 | |
| INVENTOR(S) | : Ur | |

It is certified that error appears in the above-identified patent and that said Letters Patent is hereby corrected as shown below:

Title Page, Item (73), under "Assignee", in Column 1, Lines 1-2, delete "Empire Technology Develoment LLC, Wilmington, DE (US)" and insert -- Empire Technology Development LLC, Wilmington, DE (US) --, therefor.

Signed and Sealed this
Fifth Day of April, 2016

Michelle K. Lee
*Director of the United States Patent and Trademark Office*